US008600312B2

(12) United States Patent
Quan et al.

(10) Patent No.: US 8,600,312 B2
(45) Date of Patent: Dec. 3, 2013

(54) METHOD AND APPARATUS FOR SPECTRAL SENSING

(75) Inventors: Zhi Quan, San Diego, CA (US); Stephen J. Shellhammer, Ramona, CA (US); Wenyi Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 849 days.

(21) Appl. No.: 12/693,284

(22) Filed: Jan. 25, 2010

(65) Prior Publication Data

US 2011/0183621 A1 Jul. 28, 2011

(51) Int. Cl.
*H04B 17/00* (2006.01)

(52) U.S. Cl.
USPC ....... 455/67.13; 455/85; 455/67.11; 455/214; 370/342

(58) Field of Classification Search
USPC .......... 455/67.13, 85, 67.11, 214, 263, 196.1, 455/139, 205; 370/342, 474
See application file for complete search history.

(56) References Cited

U.S. PATENT DOCUMENTS

| | | | | |
|---|---|---|---|---|
| 6,463,408 B1* | 10/2002 | Krasny et al. | ................. | 704/217 |
| 6,564,184 B1* | 5/2003 | Eriksson | ........................ | 704/226 |
| 6,580,772 B2* | 6/2003 | Pajukoski | ..................... | 375/350 |
| 6,917,795 B2* | 7/2005 | Antoine et al. | ............... | 455/296 |
| 7,027,591 B2* | 4/2006 | Cairns | ...................... | 379/406.05 |
| 7,103,537 B2* | 9/2006 | Witzgall et al. | ............... | 704/219 |
| 7,170,928 B1* | 1/2007 | Horneman et al. | ........... | 375/225 |
| 7,809,020 B2* | 10/2010 | Douglas et al. | ................ | 370/474 |
| 8,134,990 B2* | 3/2012 | Kangas et al. | ................. | 370/342 |
| 2002/0065664 A1* | 5/2002 | Witzgall et al. | ................ | 704/500 |
| 2005/0026572 A1* | 2/2005 | Dasgupta et al. | .......... | 455/114.2 |
| 2007/0230403 A1* | 10/2007 | Douglas et al. | ................ | 370/334 |
| 2008/0152353 A1* | 6/2008 | de Boer et al. | ................ | 398/159 |
| 2011/0143773 A1* | 6/2011 | Kangas et al. | .............. | 455/456.1 |
| 2012/0120970 A1* | 5/2012 | Wang et al. | .................... | 370/480 |

OTHER PUBLICATIONS

Cabric D., et al., "Implementation Issues in Spectrum Sensing for Cognitive Radios", Signals, Systems and Computers, 2004.Conference Record of the Thirty-Eighth Asilomar Conference on Pacific Grove, CA, USA Nov. 7-10, 2004, Piscataway, NJ, USA, IEEE, vol. 1, Nov. 7, 2004, pp. 772-776, XP010781056,DOI: DOI : 10.1109/ACSSC. 2004.1399240 ISBN: 978-0-7803-8622-8.
Gok A et al., "Estimating the number of frequency hopping interferers using spectral sensing with time and frequency offset measurements", Military Communications Conference, 2009. MILCOM 2009. IEEE, IEEE, Piscataway, NJ,USA, Oct. 18, 2009, pp. 1-7, XP031609553, ISBN: 978-1-4244-5238-5.
International Search Report and Written Opinion—PCT/US2011/022372—ISA/EPO—Aug. 11, 2011.

(Continued)

*Primary Examiner* — Minh D Dao
(74) *Attorney, Agent, or Firm* — James K. O'Hare

(57) ABSTRACT

An apparatus for wireless communication includes a processing system. The processing system is configured to estimate a power spectral density of a first signal. In addition, the processing system is configured to determine a normalized correlation detector between the estimated power spectral density and a known power spectral density of a second signal. Furthermore, the processing system is configured to determine whether the first signal contains the second signal based on the normalized correlation detector.

64 Claims, 5 Drawing Sheets

(56) References Cited

OTHER PUBLICATIONS

Shellhammer, S.J.: "Spectrum sensing in IEEE802.22" First Workshop on Cognitive Info. Process. (CIP 2008) Jun. 9, 2008, XP002557132 Retrieved from the Internet: URL:http://www.eurasip.org/Proceedings/Ext /CIP2008/papers/1569094657.pdf> [retrieved on Nov. 23, 2009] paragraphs [06.4]-[06.6].

Suski C William II et al., "Using Spectral Fingerprints to Improve Wireless Network Security", Global Telecommunications Conference 2008. IEEE GLOBECOM 2008. IEEE, IEEE, Piscataway, NJ, USA, Nov. 30, 2008, pp. 1-5, XP031370104, ISBN: 978-1-4244-2324-8.

Zhi Quan et al., "Spectrum Sensing by Cognitive Radios at Very Low SNR", Global Telecommunications Conference, 2009. GLOBECOM 2009. IEEE, IEEE, Piscataway, NJ, USA, Nov. 30, 2009, pp. 1-6, XP031646424, ISBN: 978-1-4244-4148-8.

* cited by examiner

METHOD AND APPARATUS FOR SPECTRAL SENSING

BACKGROUND

1. Field

The following description relates generally to digital signal processing and, more particularly, to a method and apparatus for spectral sensing.

2. Background

The Federal Communications Commission (FCC) is developing rules to allow white space devices to use the TV frequency bands provided that the devices do not cause harmful interference to TV receivers. To avoid causing interference, the devices must continuously sense the environment, dynamically identify unused spectral segments (i.e., white space), and operate in the identified white space without causing interference. One essential function of white space devices is that they reliably detect weak incumbent signals at a very low signal-to-noise ratio (SNR). One technique for spectrum sensing is disclosed by Chang et al., "Spectral Correlation Sensing," IEEE 802.22-07/0284rl, July 2007. The disclosed technique is deficient in its ability to reliably detect weak signals in practical radio systems, as the technique does not adapt to a scaling factor introduced by the automatic gain control (AGC) and/or low-noise amplifier (LNA) of the RF front-end, and in addition, does not account for a frequency offset introduced due to a mismatch between the local oscillator and the oscillator at the transmitter. As such, there is a need for an improved and practical detection technique that can reliably detect weak signals at a very low SNR.

SUMMARY

In an aspect of the disclosure, an apparatus for wireless communication includes a processing system. The processing system is configured to estimate a power spectral density of a first signal. In addition, the processing system is configured to determine a normalized correlation detector between the estimated power spectral density and a known power spectral density of a second signal. Furthermore, the processing system is configured to determine whether the first signal contains the second signal based on the normalized correlation detector.

In an aspect of the disclosure, a method of wireless communication includes estimating a power spectral density of a first signal, determining a normalized correlation detector between the estimated power spectral density and a known power spectral density of a second signal, and determining whether the first signal contains the second signal based on the normalized correlation detector.

In an aspect of the disclosure, an apparatus for wireless communication includes means for estimating a power spectral density of a first signal, means for determining a normalized correlation detector between the estimated power spectral density and a known power spectral density of a second signal, and means for determining whether the first signal contains the second signal based on the normalized correlation detector.

In an aspect of the disclosure, a computer program product includes a computer-readable medium. The computer-readable medium includes code for estimating a power spectral density of a first signal, determining a normalized correlation detector between the estimated power spectral density and a known power spectral density of a second signal, and determining whether the first signal contains the second signal based on the normalized correlation detector.

DETAILED DESCRIPTION

Various aspects of the novel systems, apparatus and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of disclosure is intended to cover any aspect of the novel systems, apparatus and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Examples of apparatuses suitable for incorporating various aspects of the invention include, but are not limited to, a mobile phone capable of operating in a wireless network. A mobile phone may be referred to as a user terminal, a mobile station, a mobile device, a subscriber station, a wireless device, a terminal, an access terminal, a node, or some other suitable terminology. The various concepts described throughout this disclosure are intended to apply to all suitable apparatuses regardless of their specific nomenclature.

Figure 1:
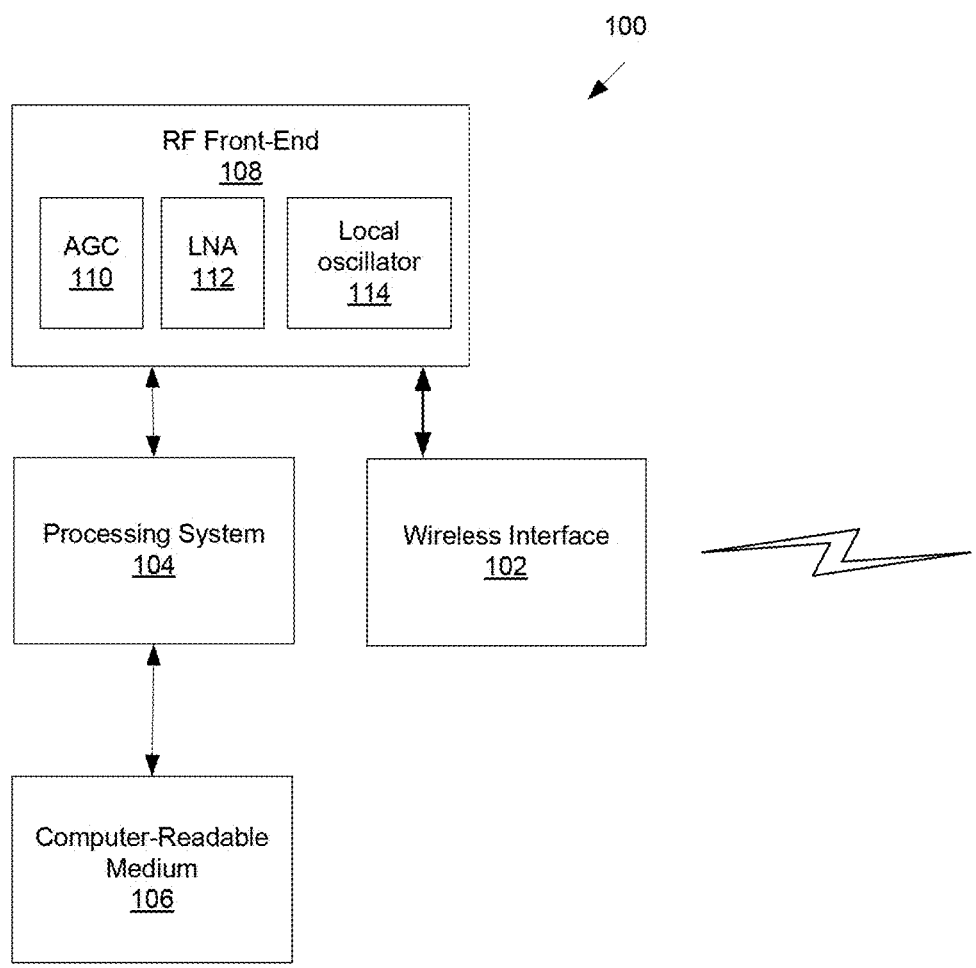
FIG. 1 is a conceptual block diagram illustrating a hardware configuration for an exemplary apparatus.

Various aspects of an apparatus will now be presented with reference to FIG. 1. FIG. 1 is a conceptual block diagram illustrating a hardware configuration for an apparatus. The apparatus 100 may include a wireless interface 102; an RF front-end 108; a computer-readable medium 106; and a processing system 104 coupled to the wireless interface 102, the RF front-end 108, and the computer-readable medium 106. The RF front-end 108 includes an AGC 110, an LNA 112, and a local oscillator 114.

The wireless interface 102 may include a transceiver having a transmitter and receiver function to support two-way communications over the wireless medium. Alternatively, the wireless interface 102 may be configured as a transmitter or receiver to support one-way communications. The wireless interface 102 is shown as a separate entity. However, as those skilled in the art will readily appreciate, the wireless interface 102, or any portion thereof, may be integrated into the processing system 104, or distributed across multiple entities within the apparatus 100.

The processing system 104 may include one or more processors. The one or more processors may be implemented with any combination of general-purpose microprocessors, microcontrollers, a Digital Signal Processors (DSP), Field Programmable Gate Arrays (FPGA), Programmable Logic Devices (PLD), controllers, state machines, gated logic, discrete hardware components, or any other suitable entities that can perform calculations or other manipulations of information.

The computer-readable medium 106 includes code for performing functions of the processing system 104. That is, the computer-readable medium 106 stores software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 104 to perform the various functions described below, as well as other protocol processing functions.

The computer-readable medium 106 is shown as a separate entity. However, as those skilled in the art will readily appreciate, the computer-readable medium 106, or any portion thereof, may be integrated into the processing system 104. As such, the processing system 104 may include the computer-readable medium 106 for storing software. Alternatively, the computer-readable medium 106 may be distributed across multiple entities within the apparatus 100.

In one configuration, the apparatus 100 may be a computer program product and include the computer-readable medium 106. The computer-readable medium 106 may be a storage external to the processing system 104, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. The computer-readable medium 106 may also be referred to as machine-readable media. Machine-readable media may include a transmission line or a carrier wave that encodes a data signal. Those skilled in the art will recognize how best to implement the described functionality for the processing system.

Figure 2:
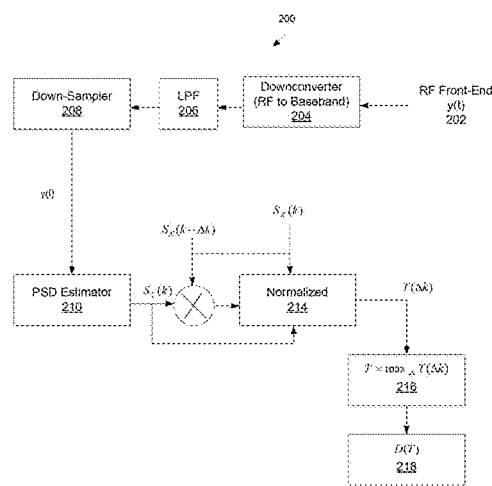
FIG. 2 is a block/flow diagram for an exemplary spectral sensing method.

FIG. 2 is a block/flow diagram 200 for an exemplary spectral sensing method. As shown in FIG. 2, a signal y(t) 202, captured from the RF front-end, is downcoverted to the baseband by the downconverter 204. After down-conversion, the signal is passed through a low-pass filter (LPF) 206 and then is down-sampled by the down-sampler 208. The down-sampled signal, y(l), where l is the index of the sample in the time domain, is input to the power spectral density (PSD) estimator 210. The PSD estimator 210 estimates the PSD, denoted by $S_Y(k)$, of the baseband signal y(l) by calculating its periodogram, which may be an FFT-based spectrum estimation technique or another advanced PSD estimation procedure. The estimated PSD, $S_Y(k)$, is multiplied with $S_X(k-\Delta k)$, where $\Delta k$ is a frequency shift/offset and is an integer, and the product is summed over k. $S_X(k)$ is the a priori known PSD (i.e., spectral mask or feature) of a sampled signal of interest x(l). The signal of interest x(t) (i.e., the signal to detect) may be an Advanced Television Systems Committee (ATSC) signal for digital television, a National Television Systems Committee (NTSC) signal for analog television, or another type of signal. The result of the summed product is normalized 214 to obtain the following normalized correlation:

$$T(\Delta k) = \frac{\left[\sum_{k=0}^{N-1} S_X(k-\Delta k) S_Y(k)\right]^2}{\sum_{k=0}^{N-1} S_X^2(k-\Delta k) \sum_{k=0}^{N-1} S_Y^2(k)}, \quad \text{Eq. (1)}$$

for $-F_o/\Delta f \le \Delta k \le F_o/\Delta f$.

In Eq. (1), $F_o$ denotes the maximum frequency offset in terms of frequency bins (i.e., frequency resolution $\Delta f$). The bandwidth of the PSD equals $N*\Delta f$, where N is an integer, and the frequency offset equals $\Delta k \Delta f$. Mathematically, it can be shown that $0 \le T(\Delta k) \le 1$. Alternatively, the normalized correlation can be calculated as follows:

$$T(\Delta k) = \frac{\sum_{k=0}^{N-1} S_X(k-\Delta k) S_Y(k)}{\sum_{k=0}^{N-1} S_X(k) \sum_{k=0}^{N-1} S_Y(k)}, \quad \text{Eq. (2)}$$

for $-F_o/\Delta f \le \Delta k \le f_o/\Delta f$.

A detector T is selected (216) to be the maximum of the normalized correlation over $\Delta k$:

$$T = \max_{\Delta k} T(\Delta k).$$

The frequency shift corresponding to T will most likely be the exact frequency offset introduced by the local oscillator. Furthermore, the detector T is insensitive to the scaling effect caused by the AGC and/or LNA in the RF front-end, as the scaling effect has been eliminated by the normalization.

The detector T is compared with a predetermined threshold γ for decision making, indicated by D(T) (218). If $T \ge \gamma$, then the detector determines that the signal y includes or contains the signal x, otherwise the detector determines that the signal y does not include or contain the signal x. The predetermined threshold γ can be different for different normalization methods. The threshold γ can be obtained empirically or analytically from a given false alarm rate, which is defined as the probability of reporting the presence of the signal when the signal is actually absent.

The aforementioned steps are performed for each of the a priori known PSDs of the signals of interest. That is, there is a set of signals of interest x, and for the PSD of each sampled signal x(l), a detector T is determined and compared with the predetermined threshold in order to classify the signal y as containing any of the signals x. In one configuration, as discussed supra, the set of signals of interest x may at least include an ATSC signal and an NTSC signal.

In one configuration, the PSD estimator 210 may be configured to truncate one or more of the spectral masks. That is, the PSD estimator 210 may be configured to truncate $S_X(k)$ for one or more of the signals of interest x. In one configuration, the PSD estimator 210 truncates the ATSC spectral mask to include only the first 1.5 MHz (of the 6 MHz bandwidth) including the pilot and maintains (does not truncate) the entire 6 MHz bandwidth including three carriers for the NTSC spectral mask. In such a configuration, the PSD estimator 210 keeps the rapidly changing spectral features (spike-like) signal in the first 1.5 MHz of the ATSC spectral mask and removes the remaining 4.5 MHz of signal, which is relatively flat.

When multiple receive antennas are available, the sensing algorithm can be improved using diversity combining techniques. For example, the PSD estimator 210 may estimate the received signal PSD by combining the PSDs of each signal received from each of the multiple antennas, $S_{Y,m}(k)$, where $S_{Y,m}(k)$ is the PSD of the $m^{th}$ antenna. In one example, the PSD estimator 210 sets $S_Y(k)$ to the average of the PSDs $S_{Y,m}(k)$. In another example, the PSD estimator 210 sets $S_Y(k)=\max_m(S_{Y,m}(k))$, for $0 \le k \le (N-1)$. That is, for each value of k, the maximum PSD estimate at the index k is selected. The combined PSD $S_Y(k)$ would therefore contain, for each index k, the maximum PSD estimate over the PSDs $S_{Y,m}(k)$.

Rather than combining the PSDs, a detector $T_m$ can be determined for each signal received from each of the multiple antennas, where $T_m$ is the detector from the $m^{th}$ antenna, and the detector T can be determined by fusing/combining the detectors $T_m$ obtained from the multiple antennas. In one example, the detectors $T_m$ are averaged to determine T. In another example, the detector T is set to the maximum of the detectors $T_m$. In another example, a linear combination of the detectors $T_m$ can be used to determine the detector T. For example, T can be set to $a_1T_1+a_2T_2+ \ldots +a_mT_m$. In one configuration, the coefficients $a_1, a_2, \ldots, a_m$ are determined through maximal-ratio combining (MRC), which is a method of diversity combining in which each coefficient is proportional to the RMS signal level and inversely proportional to the mean square noise level of the channel for the corresponding signal.

Figure 3:
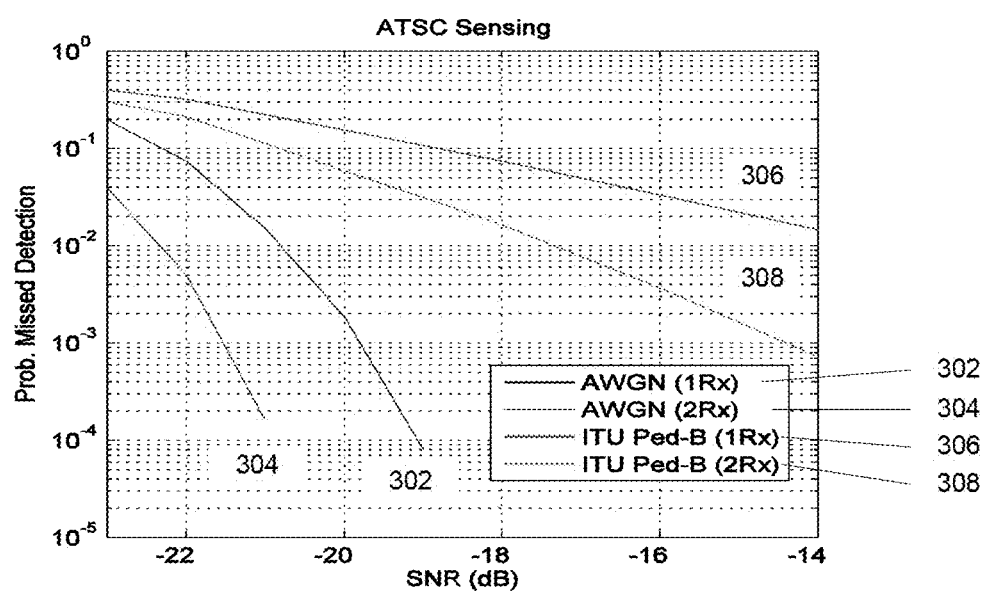
FIG. 3 is a chart showing the missed detection rate versus the SNR for ATSC signals.
Figure 4:
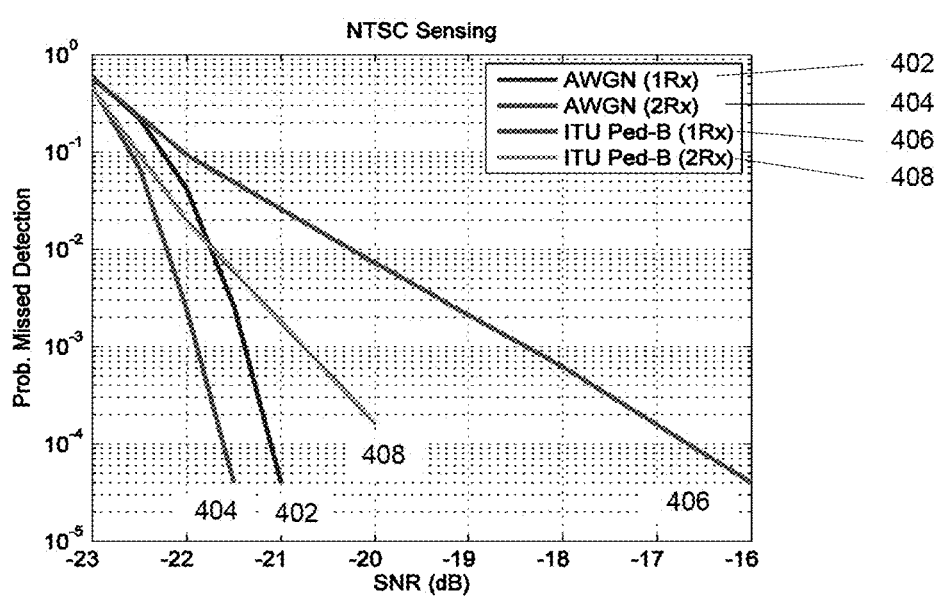
FIG. 4 is a chart showing the missed detection rate versus the SNR for NTSC signals.

FIG. 3 is a chart showing the missed detection rate versus the SNR for ATSC signals with a 12 ms detection time and a false alarm rate of less than 0.001 and using the normalized correlation function of Eq. (1). FIG. 4 is a chart showing the missed detection rate versus the SNR for NTSC signals with a 6 ms detection time and a false alarm rate of less than 0.001 and using the normalized correlation function of Eq. (1). Performance of the exemplary method and apparatus has been evaluated for digital TV (ATSC) and analog TV (NTSC) signals. For ATSC signals, the detection method can achieve a missed detection rate less than 0.005 at SNR equal to −16 dB with 12 ms detection time using two receive antennas (see signal 308 in the additive white Gaussian noise (AWGN) channel). For NTSC signals, the detection method can achieve a missed detection rate less than 0.0001 at SNR equal to −16 dB with 6 ms detection time using only one receive antenna (see signal 406 in the multipath fading channel (International Telecommunications Union (ITU) Ped-B)).

Figure 5:
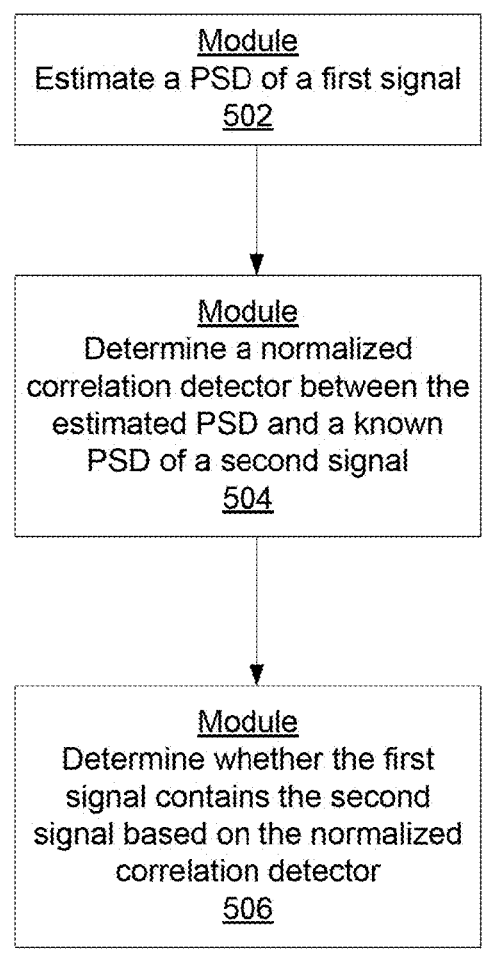
FIG. 5 is a modular diagram of an exemplary apparatus.

FIG. 5 is a modular diagram of an exemplary apparatus 500. As shown in FIG. 5, the exemplary apparatus 500, which may be the processing system 104, includes a module 502 for estimating the PSD of a first signal y. The apparatus 500 further includes a module 504 for determining a normalized correlation detector T between the estimated PSD and a known PSD of a second signal x. The apparatus 500 further includes a module 506 for determining whether the first signal y contains the second signal x based on the normalized correlation detector T. In one configuration, an apparatus for wireless communications includes means for estimating a power spectral density of a first signal, means for determining a normalized correlation detector between the estimated power spectral density and a known power spectral density of a second signal, and means for determining whether the first signal contains the second signal based on the normalized correlation detector. The aforementioned means is the processing system 104 configured to perform the function identified in each of the aforementioned means.

Referring again to FIG. 1, as described supra, the exemplary apparatus and method accounts for a frequency offset introduced by the local oscillator 114 and is insensitive to the scaling effect caused by the AGC 110 and/or LNA 112 in the RF front-end. The frequency offset arises when there is a mismatch between the local oscillator 114 and the oscillator at the transmitter. This mismatch results in a certain frequency offset, which is commonly seen in wireless communication systems due to the unperfected manufacturing of oscillators as well as propagation impairments. The frequency offset leads to a lag in the spectral correlation function between the spectral signatures of the received signals and pre-stored signature information, and thus results in degradation of the detection performance. The scaling effect arises when the captured signal is attenuated by the AGC 110 and/or is amplified by the LNA 112. Because the AGC 110 and LNA 112 are the essential components of a wireless communication system, the signal captured in the RF front-end will inevitably be attenuated or amplified by an unknown scaling factor. The exemplary apparatus and method adapts to this scaling factor. Consequently, the exemplary apparatus and method are less vulnerable to decision errors than the technique in Chang et al. when the spectral correlation detector is compared with a predetermined threshold.

The exemplary apparatus and method can reliably detect the weak signal of interest at a very low SNR and is insensitive to channel impairments caused by noise, shadowing, and multipath fading. More importantly, the exemplary apparatus and method are insensitive to RF impairments caused by the AGC 110, the LNA 112, a frequency offset, and phase noise.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. An apparatus for wireless communication, comprising:
   a processing system configured to:
      estimate a power spectral density of a first signal;
      determine a normalized correlation detector between the estimated power spectral density and a known power spectral density of a second signal; and
      determine whether the first signal contains the second signal based on the normalized correlation detector.

2. The apparatus of claim 1, wherein the processing system is further configured to determine a plurality of normalized correlation values as a function of a frequency shift and to find a maximum normalized correlation value of the plurality of normalized correlation values, the normalized correlation detector being the maximum normalized correlation value.

3. The apparatus of claim 2, wherein the processing system is further configured to compare the normalized correlation detector to a threshold to determine whether the first signal contains the second signal.

4. The apparatus of claim 2, wherein each of the plurality of normalized correlation values corresponds to a different frequency shift.

5. The apparatus of claim 2, wherein the plurality of normalized correlation values, $T(\Delta k)$, is determined as follows:

$$T(\Delta k) = \frac{\left[\sum_{k=0}^{N-1} S_X(k-\Delta k)S_Y(k)\right]^2}{\sum_{k=0}^{N-1} S_X^2(k-\Delta k) \sum_{k=0}^{N-1} S_Y^2(k)},$$

for $-F_o/\Delta f \leq \Delta k \leq F_o/\Delta f$, where $S_Y(k)$ is the estimated power spectral density, $S_X(k)$ is the known power spectral density, and $\Delta k$ is a frequency shift.

6. The apparatus of claim 2, wherein the plurality of normalized correlation values, $T(\Delta k)$, is determined as follows:

$$T(\Delta k) = \frac{\sum_{k=0}^{N-1} S_X(k-\Delta k)S_Y(k)}{\sum_{k=0}^{N-1} S_X(k) \sum_{k=0}^{N-1} S_Y(k)},$$

for $-F_o/\Delta f \leq \Delta k \leq F_o/\Delta f$, where $S_Y(k)$ is the estimated power spectral density, $S_X(k)$ is the known power spectral density, and $\Delta k$ is a frequency shift.

7. The apparatus of claim 1, wherein the second signal is at least one selected from the group consisting of an ATSC signal and an NTSC signal.

8. The apparatus of claim 7, wherein the second signal is said ATSC signal and the known power spectral density is truncated before determining the normalized correlation detector.

9. The apparatus of claim 1, further comprising a transceiver coupled to the processing system, the transceiver comprising a plurality of antennas;
wherein to estimate the power spectral density of the first signal, the processing system is configured to estimate the power spectral density of a signal received by each of the antennas,
wherein to determine said normalized correlation detector, the processing system is configured to determine a plurality of normalized correlation detectors between the estimated power spectral density of the signal received by each of the antennas and the known power spectral density of the second signal, and to combine the plurality of normalized correlation detectors to obtain said normalized correlation detector.

10. The apparatus of claim 9, wherein the processing system is configured to obtain said normalized correlation detector by averaging the plurality of normalized correlation detectors.

11. The apparatus of claim 9, wherein the processing system is configured to obtain said normalized correlation detector by setting said normalized correlation detector equal to a linear combination of the plurality of normalized correlation detectors.

12. The apparatus of claim 11, wherein said normalized correlation detector is T, T is set equal to $a_1T_1 + a_2T_2 \pm \ldots \pm a_mT_m$, and coefficients $a_1, a_2, \ldots, a_m$ are determined through maximal-ratio combining.

13. The apparatus of claim 9, wherein the processing system is configured to obtain said normalized correlation detector T as follows:
$T = \max_m(T_m)$, where $T_m$ is the normalized correlation detector of an $m^{th}$ antenna.

14. The apparatus of claim 1, further comprising a transceiver coupled to the processing system, the transceiver comprising a plurality of antennas;
wherein to estimate said power spectral density of the first signal, the processing system is configured to estimate a plurality of power spectral densities of signals received by the antennas and to combine the plurality of power spectral densities to obtain said power spectral density of the first signal.

15. The apparatus of claim 14, wherein the processing system is configured to obtain said power spectral density by averaging the plurality of power spectral densities.

16. The apparatus of claim 14, wherein the processing system is configured to obtain said power spectral density, $S_Y(k)$, as follows:
$S_Y(k) = \max_m(S_{Y,m}(k))$, for $0 \leq k \leq (N-1)$, where $S_{Y,m}(k)$ is the power spectral density of an $m^{th}$ antenna.

17. A method of wireless communication, comprising:
estimating a power spectral density of a first signal captured from an RF front end;
determining a normalized correlation detector between the estimated power spectral density and a known power spectral density of a second signal; and
determining whether the first signal contains the second signal based on the normalized correlation detector.

18. The method of claim 17, further comprising:
determining a plurality of normalized correlation values as a function of a frequency shift; and
finding a maximum normalized correlation value of the plurality of normalized correlation values, the normalized correlation detector being the maximum normalized correlation value.

19. The method of claim 18, further comprising comparing the normalized correlation detector to a threshold to determine whether the first signal contains the second signal.

20. The method of claim 18, wherein each of the plurality of normalized correlation values corresponds to a different frequency shift.

21. The method of claim 18, wherein the plurality of normalized correlation values, $T(\Delta k)$, is determined as follows:

$$T(\Delta k) = \frac{\left[\sum_{k=0}^{N-1} S_X(k-\Delta k)S_Y(k)\right]^2}{\sum_{k=0}^{N-1} S_X^2(k-\Delta k) \sum_{k=0}^{N-1} S_Y^2(k)},$$

for $-F_o/\Delta f \leq \Delta k \leq F_o/\Delta f$, where $S_Y(k)$ is the estimated power spectral density, $S_X(k)$ is the known power spectral density, and $\Delta k$ is a frequency shift.

22. The method of claim 18, wherein the plurality of normalized correlation values, $T(\Delta k)$, is determined as follows:

$$T(\Delta k) = \frac{\sum_{k=0}^{N-1} S_X(k - \Delta k) S_Y(k)}{\sum_{k=0}^{N-1} S_X(k) \sum_{k=0}^{N-1} S_Y(k)},$$

for $-F_o/\Delta f \le F_o/\Delta f$, where $S_Y(k)$ is the estimated power spectral density, $S_X(k)$ is the known power spectral density, and $\Delta k$ is a frequency shift.

23. The method of claim 17, wherein the second signal is at least one selected from the group consisting of an ATSC signal and an NTSC signal.

24. The method of claim 23, wherein the second signal is said ATSC signal and the known power spectral density is truncated before determining the normalized correlation detector.

25. The method of claim 17, wherein:
the estimating the power spectral density of the first signal comprises estimating the power spectral density of a signal received by each of a plurality of antennas; and
the determining said normalized correlation detector comprises:
determining a plurality of normalized correlation detectors between the estimated power spectral density of the signal received by each of the antennas and the known power spectral density of the second signal; and
combining the plurality of normalized correlation detectors to obtain said normalized correlation detector.

26. The method of claim 25, further comprising obtaining said normalized correlation detector by averaging the plurality of normalized correlation detectors.

27. The method of claim 25, further comprising obtaining said normalized correlation detector by setting said normalized correlation detector equal to a linear combination of the plurality of normalized correlation detectors.

28. The method of claim 27, wherein said normalized correlation detector is T, T is set equal to $a_1 T_1 + a_2 T_2 + \ldots + a_m T_m$, and coefficients $a_1, a_2, \ldots, a_m$ are determined through maximal-ratio combining.

29. The method of claim 25, further comprising obtaining said normalized correlation detector T as follows:
$T = \max_m(T_m)$, where $T_m$ is the normalized correlation detector of an $m^{th}$ antenna.

30. The method of claim 17, wherein the estimating said power spectral density of the first signal comprises:
estimating a plurality of power spectral densities of signals received by a plurality of antennas; and
combining the plurality of power spectral densities to obtain said power spectral density of the first signal.

31. The method of claim 30, further comprising obtaining said power spectral density by averaging the plurality of power spectral densities.

32. The method of claim 30, further comprising obtaining said power spectral density, $S_Y(k)$, as follows:
$S_Y(k) = \max_m(S_{Y,m}(k))$, for $0 \le k \le (N-1)$, where $S_{Y,m}(k)$ is the power spectral density of an $m^{th}$ antenna.

33. An apparatus for wireless communication, comprising:
means for estimating a power spectral density of a first signal;
means for determining a normalized correlation detector between the estimated power spectral density and a known power spectral density of a second signal; and
means for determining whether the first signal contains the second signal based on the normalized correlation detector.

34. The apparatus of claim 33, further comprising:
means for determining a plurality of normalized correlation values as a function of a frequency shift; and
means for finding a maximum normalized correlation value of the plurality of normalized correlation values, the normalized correlation detector being the maximum normalized correlation value.

35. The apparatus of claim 34, further comprising means for comparing the normalized correlation detector to a threshold to determine whether the first signal contains the second signal.

36. The apparatus of claim 34, wherein each of the plurality of normalized correlation values corresponds to a different frequency shift.

37. The apparatus of claim 34, wherein the plurality of normalized correlation values, $T(\Delta k)$, is determined as follows:

$$T(\Delta k) = \frac{\left[\sum_{k=0}^{N-1} S_X(k - \Delta k) S_Y(k)\right]^2}{\sum_{k=0}^{N-1} S_X^2(k - \Delta k) \sum_{k=0}^{N-1} S_Y^2(k)},$$

for $-F/\Delta f \le \Delta k \le F_o/\Delta f$, where $S_Y(k)$ is the estimated power spectral density, $S_X(k)$ is the known power spectral density, and $\Delta k$ is a frequency shift.

38. The apparatus of claim 34, wherein the plurality of normalized correlation values, $T(\Delta k)$, is determined as follows:

$$T(\Delta k) = \frac{\sum_{k=0}^{N-1} S_X(k - \Delta k) S_Y(k)}{\sum_{k=0}^{N-1} S_X(k) \sum_{k=0}^{N-1} S_Y(k)},$$

for $-F_o/\Delta f \le \Delta k \le F_o/\Delta f$, where $S_Y(k)$ is the estimated power spectral density, $S_X(k)$ is the known power spectral density, and $\Delta k$ is a frequency shift.

39. The apparatus of claim 33, wherein the second signal is at least one selected from the group consisting of an ATSC signal and an NTSC signal.

40. The apparatus of claim 39, wherein the second signal is said ATSC signal and the known power spectral density is truncated before determining the normalized correlation detector.

41. The apparatus of claim 33, wherein:
the means for estimating the power spectral density of the first signal comprises means for estimating the power spectral density of a signal received by each of a plurality of antennas; and
the means for determining said normalized correlation detector comprises:

means for determining a plurality of normalized correlation detectors between the estimated power spectral density of the signal received by each of the antennas and the known power spectral density of the second signal; and means for combining the plurality of normalized correlation detectors to obtain said normalized correlation detector.

42. The apparatus of claim 41, further comprising means for obtaining said normalized correlation detector by averaging the plurality of normalized correlation detectors.

43. The apparatus of claim 41, further comprising means for obtaining said normalized correlation detector by setting said normalized correlation detector equal to a linear combination of the plurality of normalized correlation detectors.

44. The apparatus of claim 43, wherein said normalized correlation detector is T, T is set equal to $a_1T_1 + a_2T_2 \pm \ldots \pm a_mT_m$, and coefficients $a_1, a_2, \ldots, a_m$ are determined through maximal-ratio combining.

45. The apparatus of claim 41, further comprising means for obtaining said normalized correlation detector T as follows:
$T = \max_m(T_m)$, where $T_m$ is the normalized correlation detector of an $m^{th}$ antenna.

46. The apparatus of claim 33, wherein the means for estimating said power spectral density of the first signal comprises:
means for estimating a plurality of power spectral densities of signals received by a plurality of antennas; and
means for combining the plurality of power spectral densities to obtain said power spectral density of the first signal.

47. The apparatus of claim 46, further comprising means for obtaining said power spectral density by averaging the plurality of power spectral densities.

48. The apparatus of claim 46, further comprising means for obtaining said power spectral density, $S_Y(k)$, as follows:
$S_Y(k) = \max_m(S_{Y,m}(k))$, for $0 \leq k \leq (N-1)$, where $S_{Y,m}(k)$ is the power spectral density of an $m^{th}$ antenna.

49. A computer program product, comprising:
a non-transitory computer-readable medium comprising code for:
estimating a power spectral density of a first signal;
determining a normalized correlation detector between the estimated power spectral density and a known power spectral density of a second signal; and
determining whether the first signal contains the second signal based on the normalized correlation detector.

50. The computer program product of claim 49, wherein the computer-readable medium further comprises code for:
determining a plurality of normalized correlation values as a function of a frequency shift; and
finding a maximum normalized correlation value of the plurality of normalized correlation values, the normalized correlation detector being the maximum normalized correlation value.

51. The computer program product of claim 50, wherein the computer-readable medium further comprises code for comparing the normalized correlation detector to a threshold to determine whether the first signal contains the second signal.

52. The computer program product of claim 50, wherein each of the plurality of normalized correlation values corresponds to a different frequency shift.

53. The computer program product of claim 50, wherein the plurality of normalized correlation values, $T(\Delta k)$, is determined as follows:

$$T(\Delta k) = \frac{\left[\sum_{k=0}^{N-1} S_X(k - \Delta k) S_Y(k)\right]^2}{\sum_{k=0}^{N-1} S_X^2(k - \Delta k) \sum_{k=0}^{N-1} S_Y^2(k)},$$

for $-F_o/\Delta f \leq \Delta k \leq F_o/\Delta f$, where $S_Y(k)$ is the estimated power spectral density, $S_X(k)$ is the known power spectral density, and $\Delta k$ is a frequency shift.

54. The computer program product of claim 50, wherein the plurality of normalized correlation values, $T(\Delta k)$, is determined as follows:

$$T(\Delta k) = \frac{\sum_{k=0}^{N-1} S_X(k - \Delta k) S_Y(k)}{\sum_{k=0}^{N-1} S_X(k) \sum_{k=0}^{N-1} S_Y(k)},$$

for $-F_o/\Delta f \leq \Delta f \leq F_o/\Delta f$, where $S_y(k)$ is the estimated power spectral density, $S_X(k)$ is the known power spectral density, and $\Delta k$ is a frequency shift.

55. The computer program product of claim 49, wherein the second signal is at least one selected from the group consisting of an ATSC signal and an NTSC signal.

56. The computer program product of claim 55, wherein the second signal is said ATSC signal and the known power spectral density is truncated before determining the normalized correlation detector.

57. The computer program product of claim 49, wherein:
the code for estimating the power spectral density of the first signal comprises code for estimating the power spectral density of a signal received by each of a plurality of antennas; and
the code for determining said normalized correlation detector comprises code for:
determining a plurality of normalized correlation detectors between the estimated power spectral density of the signal received by each of the antennas and the known power spectral density of the second signal; and
combining the plurality of normalized correlation detectors to obtain said normalized correlation detector.

58. The computer program product of claim 57, wherein the computer-readable medium further comprises code for obtaining said normalized correlation detector by averaging the plurality of normalized correlation detectors.

59. The computer program product of claim 57, wherein the computer-readable medium further comprises code for obtaining said normalized correlation detector by setting said normalized correlation detector equal to a linear combination of the plurality of normalized correlation detectors.

60. The computer program product of claim 59, wherein said normalized correlation detector is T, T is set equal to $a_1T_1 + a_2T_2 + \ldots + a_mT_m$, and coefficients $a_1, a_2, \ldots, a_m$ are determined through maximal-ratio combining.

61. The computer program product of claim 57, wherein the computer-readable medium further comprises code for obtaining said normalized correlation detector T as follows:

$T=\max_m(T_m)$, where $T_m$ is the normalized correlation detector of an $m^{th}$ antenna.

62. The computer program product of claim 49, wherein the code for estimating said power spectral density of the first signal comprises code for:

estimating a plurality of power spectral densities of signals received by a plurality of antennas; and combining the plurality of power spectral densities to obtain said power spectral density of the first signal.

63. The computer program product of claim 62, wherein the computer-readable medium further comprises code for obtaining said power spectral density by averaging the plurality of power spectral densities.

64. The computer program product of claim 62, wherein the computer-readable medium further comprises code for obtaining said power spectral density, $S_Y(k)$, as follows:

$S_Y(k)=\max_m(S_{Y,m}(k))$, for $0 \le k \le (N-1)$, where $S_{Y,m}(k)$ is the power spectral density of an $m^{th}$ antenna.

* * * * *